Jan. 8, 1952        G. W. SHAVER        2,581,501
CUTTING ELEMENT FOR SLICING MACHINES
Filed Jan. 24, 1948
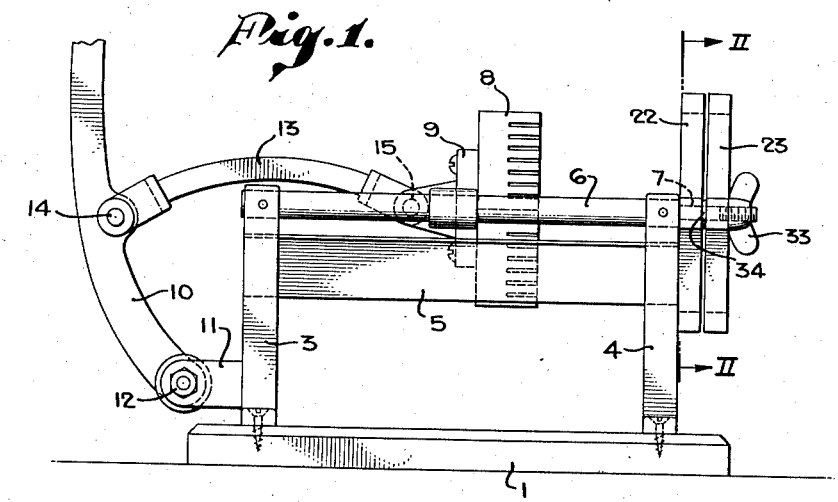
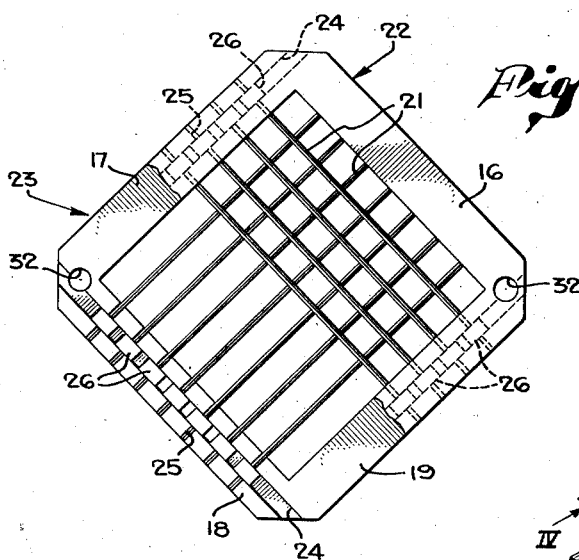
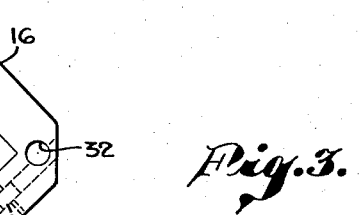
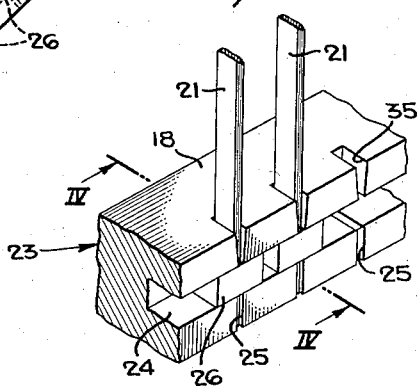
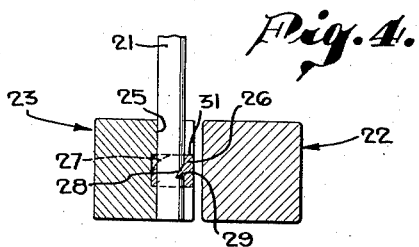
INVENTOR.
George W. Shaver
BY
ATTORNEY Patented Jan. 8, 1952

2,581,501

UNITED STATES PATENT OFFICE 2,581,501

CUTTING ELEMENT FOR SLICING MACHINES

George W. Shaver, Los Angeles, Calif.

Application January 24, 1948, Serial No. 4,110

4 Claims. (Cl. 146—169)

1

This invention relates to cutting or slicing units for vegetable slicers, such as potato, apple, beet slicers, and the like, and more particularly to a cutter having readily removable blades.

Various types of vegetable slicers have heretofore been proposed, such as that illustrated and described in Patent No. 2,120,375, issued to me under date of June 14, 1938. None of the vegetable slicers known to me provide a cutting unit so constructed that the blades may be readily removed for replacement, sharpening, or repairs. Such blades have been generally permanently secured in grooves provided in the cutting unit frame and, of course, are very difficult to remove, whereby the owner of such slicer must send the unit to the manufacturer for repair. It is therefore a primary object of this invention to provide an improved cutting unit, for a vegetable or potato slicer, having blades that may be readily removed for sharpening, replacement or repair.

It is a further object to provide means for assembling removable blades for a cutting unit of a vegetable slicer that will place the blades under sufficient tension to properly slice an object.

A further object is to provide a cutting unit having the above characteristics that may be readily assembled or disassembled for cleaning, inspection and repair.

A still further object is to provide a cutting unit having the above characteristics that will be durable, efficient in operation, and comparatively cheap to manufacture.

The above and other objects will be made apparent throughout further description of the invention when taken in connection with the accompanying drawings wherein like reference characters refer to like parts. It is to be distinctly understood that the drawings are not a definition of the invention but merely illustrate a preferred form by means of which the invention may be effectuated.

In the drawings:

Fig. 1 is a side elevation of a slicing machine embodying the invention.

Fig. 2 is a sectional view taken along line II—II of Fig. 1.

Fig. 3 is an enlarged fragmentary view, in perspective, illustrating the manner in which the blades are secured to the frame.

Fig. 4 is a sectional view taken along line IV—IV of Fig. 3.

Referring to the drawings, the present invention is illustrated in connection with the framework similar to that illustrated and described in my abovementioned patent wherein there is provided a base 1 having spaced, vertical standards 3 and 4. These standards 3 and 4 may be of M shape in order to provide a V-shaped groove for supporting a V-shaped guide or trough 5. The top of the standards are connected by rods 6, the outer end of the rod 6 extending through and outwardly from the standard 4 and reduced, as shown at 7, the purpose of which will be later described. A bossed presser or extrusion block 8 is slidably mounted on the rods 6 by means of a carriage 9. A lever 10 having its lower end connected to a lug 11 extending from the standard 3 and pivoted thereto, as shown at 12, is provided for actuating a link 13, the latter being pivotally connected at one end to the lever 10, as shown at 14, and pivotally connected to the carriage 9, as shown at 15. It can therefore be understood that upon moving the lever backward and forward about its pivot 12 the block 8 may be slid along the rods 6.

The cutting unit of the present invention consists of two substantially identical, open frames which may be of any desired shape, but preferably square, each frame having four side members 16, 17, 18 and 19. The blades of the frame comprising the inner frame unit 22 are positioned at an angle to the blades 21 carried by the outer cutting unit 23. Means is provided for detachably securing the blades to the frames of their respective units, which means consists in providing a longitudinal groove 24 in one side of each of opposing frame members such as 16 and 18 of one frame and 17 and 19 of another frame. The frame members 16, 17, 18 and 19 are provided with spaced, transverse slots 25 for receiving cooperating ends of the spaced parallel blades 21. Attached to and adjacent each end of each blade is a stop or anchor member 26. The anchor members 26 may be slit in order to embrace portions of the blade 21 and further provided with an inwardly extending projection 28, the projection extending from the closed side of the slit in the anchor and in which the blade is positioned. The blade 21 may be notched, as shown at 29, for receiving and cooperating with the projection 28 in order to prevent longitudinal movement of the anchor 26 relative to the blade 21. The stops 26 may be die cast, pressed on, brazed or welded to the blades and may be in the form of a ball, cylinder or block. The distance between stops on each blade is correlated to the distance between parallel locking grooves 24 of a frame unit.

In the installation of the blades within the frame, the anchor 26 at one end of the blade is slipped into the locking groove 24 and thereafter the anchor 26 at the other end of the blade is inserted into the cooperating groove 24 carried by the opposing, parallel frame member of the same unit. The curved portion 27 of the anchor member 26 permits the anchor to initially enter the slot 24 and upon further movement or tapping of the anchor into the slot, the curved portion will operate to draw the blade tight, into tension, as the anchor is forced into the groove 24. When the anchor 26 is fully positioned within the groove 24, the upper flat portion 31 thereof is held against the upper side of the groove 24 and holds the blade in position, maintaining such blade under the required tension.

It will be clear from the drawings that the blades of the cutting elements 22 and 23 will be carried by the opposing faces of the frames of the cutting elements 22 and 23, the blades of both elements having their cutting edges facing rearwardly and in the same direction. The anchors of blades in one cutting unit are held in their grooves not only by tension of the blades and friction but also by the ungrooved frame members of the adjacent cutting unit. It will be noted that since grooves 24 are spaced from the inner edges of the parallel frame members of a unit, a portion of the longitudinal edge of a blade rests against the back of slot 25, in outer frame 23, and against the abutting frame 23 when the knife is in inner frame 22, thereby imparting resistance to cutting pressure.

For the purpose of detachably mounting the cutting units on the machine, each of the frames is provided with openings 32 disposed through opposite corners of the frames. The openings 32 are arranged to receive the reduced end portions 7 of the rods 6. The frames may be conveniently held thereon in rigid, fixed relation by means of threaded thumb screws 33.

In order that the blades of one cutting element may be properly spaced from the blades of the other cutting element, the slots 25 may be deep enough to permit the blade to lie in a plane spaced from the plane of the frame edges, or a spacer member 34 may be provided on the reduced portion 7 of the rod 6 and positioned between the frames of the two cutting elements.

Another feature of the invention is the tapering or widening of the inner ends of the slots 25, as shown at 35 (see Fig. 3). The slots 25 may be of V shape, whereby a limited transverse movement of the blades at the zone of entry into the frame is permitted, thereby preventing sharp localized stress on the blades, and preventing crystallization and breakage of the blades at the juncture of the blades with the frame. By making slots 25 somewhat wider than blades 21, even without tapering them, anchors 26 being spaced away from the inner edges of frame members, flexing of blades can take place without breakage. The central blade of each frame may be wider than the others and provided with transverse slots extending part way therethrough to receive and position the thin blades of the other frame.

Accordingly, there is provided a cutting unit for slicing machines wherein the blades may be readily removed for sharpening, replacing, or repairing. The blades are secured to the frame of the cutting unit in such manner as to maintain the blades under the proper tension and at the same time permit sufficient movement of the blades at the juncture of the blades with the cutting element frame to prevent sharp stresses and breakage of the blades. The present cutting unit may be readily assembled and disassembled for cleaning and repairing, is durable and efficient in operation, and can be manufactured at a very small cost.

While I have illustrated and described one form of the invention, it will now be apparent to those skilled in the art that certain changes, substitutions, additions, and omissions may be made in the exemplary form shown without departing from the spirit and scope of the invention as defined by the appended claims.

I claim:

1. A cutting unit for a slicing machine, including a pair of opposed four-sided frame members, alternate opposing sides of said frame members having longitudinal grooves therein, spaced transverse slots in said sides cooperating with said longitudinal grooves, spaced parallel blades extending across said frame having their ends disposed in said transverse slots, the width of each slot at the inner end thereof being substantially greater than the thickness of the blade disposed therein, and identical means attached to each blade adjacent each end thereof for securing each blade in said frame, each securing means lying within its associated groove and extending transversely to the plane of its blade.

2. In a cutting unit for a slicing machine including an open frame provided with a series of parallel spaced blades thereacross, the provision of: an open frame having side frame members, a longitudinal groove in the lateral face of opposing side frame members, said grooves forming outwardly facing shoulders, a plurality of transverse spaced slots in the lateral face of each side frame member and shoulder formed therein, said slots being in communication with the groove; a blade having end portions slidably receivable in said slots, and rigid unitary identical anchor means connected to each end of each blade, each anchor means being of greater thickness than the blade and including a convex face arranged to slidably contact the shoulder adjacent the slot and guide the anchor means into the groove, the normal distance between the anchor means connected to each blade being slightly less than the distance separating the outwardly facing shoulders formed in opposing side frame members.

3. A device of the character stated in claim 2 wherein the end portions of each blade are provided with a notch and the anchor means are slotted and are connected to the blade by locking engagement of the anchor means with said notch.

4. A slicing unit for a slicing machine including a pair of opposed four-sided frame members, alternate opposing sides of said frame members having longitudinal grooves therein, spaced transverse slots in said sides cooperating with said longitudinal groove, spaced parallel blades extending across said frame, having their ends disposed in said transverse slots, and identical means carried on each end of each blade within said longitudinal grooves for securing the blades in said frame, each securing means having a width greater than the associated transverse slot for bearing against a side of the accommodating groove, the normal distance between the securing means of each blade being slightly less than the distance separating the cooperating longitudinal grooves on opposite sides of the frame and one edge of each securing means being curved, whereby the forcing of a securing means into a groove applies tension to said blade.

GEORGE W. SHAVER.

REFERENCES CITED

The following references are of record in the file of this patent:

UNITED STATES PATENTS

| Number | Name | Date |
|---|---|---|
| 1,357,829 | Anstice | Nov. 2, 1920 |
| 2,120,375 | Shaver et al. | June 14, 1938 |
| 2,131,092 | Bloomfield | Sept. 27, 1938 |
| 2,283,029 | Bakewell | May 12, 1942 |

FOREIGN PATENTS

| Number | Country | Date |
|---|---|---|
| 801,086 | France | May 16, 1936 |